United States Patent [19]
Bunke et al.

[11] Patent Number: 6,013,294
[45] Date of Patent: Jan. 11, 2000

[54] SHELF-STABLE COMPLETE PRE-MIXES THAT ARE COMBINABLE TO FORM READY-TO-COOK MIXES OR FOOD BEVERAGE PRODUCTS

[75] Inventors: Paul Ralph Bunke; Athula Ekanayake; Kenneth Thomas Smith, all of Cincinnati, Ohio

[73] Assignee: The Procter & Gamble Company, Cincinnati, Ohio

[21] Appl. No.: 08/866,675

[22] Filed: May 30, 1997

[51] Int. Cl.$^7$ ..................................................... A21D 10/02
[52] U.S. Cl. ........................ 426/120; 426/123; 426/128; 426/555; 426/589; 426/590; 426/653
[58] Field of Search ................................. 426/119, 120, 426/128, 555, 653, 590, 589, 123

[56] References Cited

U.S. PATENT DOCUMENTS

| | | | |
|---|---|---|---|
| H937 | 7/1991 | Sloan | 426/549 |
| 3,160,507 | 12/1964 | Finucane | 99/94 |
| 3,547,658 | 12/1970 | Melnick | 99/113 |
| 3,622,345 | 11/1971 | Gupta | 99/94 |
| 3,962,476 | 6/1976 | Turpin | 426/398 |
| 3,970,763 | 7/1976 | Moran et al. | 426/324 |
| 4,375,484 | 3/1983 | Lee et al. | 426/549 |
| 4,524,083 | 6/1985 | Liot | 426/330.1 |
| 4,539,215 | 9/1985 | Schweid et al. | 426/589 |
| 4,656,042 | 4/1987 | Risler | 426/396 |
| 4,693,901 | 9/1987 | Hullah | 426/330.6 |
| 4,781,938 | 11/1988 | Pflaumer et al. | 426/549 |
| 4,818,553 | 4/1989 | Holscher et al. | 426/549 |
| 4,961,942 | 10/1990 | Cocco et al. | 426/94 |
| 5,178,893 | 1/1993 | Seewi et al. | 426/549 |
| 5,221,551 | 6/1993 | Fencl | 426/589 |
| 5,384,139 | 1/1995 | Vasseneix | 426/128 |
| 5,409,720 | 4/1995 | Kent et al. | 426/128 |
| 5,478,588 | 12/1995 | Talignani | 426/572 |
| 5,593,716 | 1/1997 | Appelqvist et al. | 426/589 |

FOREIGN PATENT DOCUMENTS

| | | |
|---|---|---|
| 2025269 | 9/1970 | France . |
| 2536251 | 5/1984 | France . |
| 2686485 | 7/1993 | France . |
| 87/03784 | 7/1987 | WIPO . |
| 88/06411 | 9/1988 | WIPO . |
| 96/32018 | 10/1996 | WIPO . |

OTHER PUBLICATIONS

Patent Abstracts of Japan, vol. 097, No. 005, May 30, 1997 and JP 09 023857 A (Nissho Corp.) Jan. 28, 1997.
Database WPI, Section Ch, Week 8619.

*Primary Examiner*—Nina Bhat
*Attorney, Agent, or Firm*—Karen F. Clark; James F. McBride; Jacobus C. Rasser

[57] ABSTRACT

Shelf-stable complete pre-mixes, separated into two or more components. The components are chemically and microbially stable. At least one component is a high-water-activity liquid component. The components, when combined, provide all ingredients necessary to form uncooked mixes or food and beverage products.

18 Claims, No Drawings

6,013,294

SHELF-STABLE COMPLETE PRE-MIXES THAT ARE COMBINABLE TO FORM READY-TO-COOK MIXES OR FOOD BEVERAGE PRODUCTS

TECHNICAL FIELD

The present invention relates to shelf-stable complete pre-mixes that are used to prepare uncooked mixes or food and beverage products. More specifically, the present invention relates to pre-mixes including at least one liquid component having a water activity ($a_w$) of greater than about 0.85 and pH of preferably less than about 4.5. Each component has substantially improved microbial and chemical stability.

BACKGROUND

A food product has many ingredients. Each ingredient has a specific function and contribution to the overall acceptance of the consumable food product. Ideally, the food or beverage product prepared from the ingredients should have an acceptable appearance, texture, flavor and aroma. To achieve the desired food or beverage product, it is important that the ingredients be stable and that their function not be lost during normal storage and distribution. To achieve shelf stability the ingredients must be both chemically and microbially stable at ambient temperatures.

Shelf-stable packaged pre-mixes for preparing food and beverage compositions are quite common. However, most shelf stable packaged pre-mixes are incomplete and require the addition of certain ingredients (e.g., eggs, shortening, water or milk) to be supplied and added by the preparer. This is because if the ingredients were incorporated in the packaged pre-mixes, they would be subject to chemical reactions and microbial proliferation. Typically the preparer (e.g., a foodservice operator or a consumer), measures a quantity of the ingredients provided in the prepared pre-mix and then supplies and adds any additional ingredients necessary to form a uncooked mix (i.e., complete with all ingredients but requires cooking, e.g., by baking, frying, microwaving, etc.) or a quality and reproducibility, depends on the accuracy of measurement and equipment used by the individual preparer.

Several problems exist with many packaged pre-mixes. Inaccuracies in the steps performed by the preparer such as measuring ingredients or using different units of measure (e.g., different size eggs, teaspoons, etc.) may cause ingredients to be either too low or too high in concentration in the resulting uncooked mixes or food and beverage products. This could cause undesirable product properties, for example dryness, toughness, condensed texture, increase/decrease in viscosity. Moreover, inadequate mixing (i.e., overmixing, undermixing) may also result in RTC mixes or food and beverage products having non-homogeneous, mixture overworked ingredients e.g. gluten.

Another problem with packaged pre-mixes is how ingredients are combined. The combination of ingredients have been limited primarily by the formulator's ability to stabilize the components microbially, without the use of heat treatments (e.g., sterilization, pasteurization). Actions taken to achieve microbial stability (e.g., adding of anti-microbials, pH adjustors or reducing the $a_w$) in food compositions, especially high moisture compositions, are not always successful. This is because ingredients in the food composition may interact with the anti-microbials, be unstable at various pHs and/or need different $a_w$s to prevent the growth of various pathogens.

Many formulators, because of concerns regarding microbial stability, do not place ingredients in their most functional component or environment. For example, many known pre-mixes include dried egg whites or whole eggs in the dry component; this reduces the ability of the egg protein to hydrate properly because it must compete with other ingredients for the available water. This, in many cases is not desirable, particularly in those instances where the product depends on the egg for obtaining a certain structure or thickness. When the ingredients in the components are not in their most functional environment or are chemically unstable the resulting uncooked mix lacks the physical properties (e.g., viscosity, homogeneity, emulsification) necessary to prepare a high quality uncooked mix, and the resulting food product suffers in quality (e.g., taste, texture, appearance).

One attempt to stabilize the pre-mix microbially and reduce measuring inaccuracy is described in U.S. Pat. No. 5,409,720 (Kent et al.), issued Apr. 25, 1996. Kent et al. discloses a dough mix that includes both a moist ingredient portion and a dry ingredient portion. The moist ingredient portion includes sugar, shortening, preferably egg solids, flavorings and all the water necessary to form a complete dough. The dry ingredient portion includes all the flour required in the complete dough. The dry ingredient portion can also include leavening agents, egg solids, candy pieces, nuts, dried fruits, coconut, and other "dry" or moisture-free ingredients. The moist and dry ingredients, when combined, produce a complete dough requiring no additional ingredients.

A problem with combining the "moist" with the "dry" ingredients according to Kent et al. is that it will be difficult to ensure that all of the ingredients are thoroughly mixed so as to be dissolved, fully hydrated and dispersed for complete functionality. Moreover, while this method may provide microbial stability in some intermediate water activity doughs and pre-mixes, Kent et al.'s method would not be suitable for preparing high water activity pre-mixes, uncooked mixes or high water activity food and beverage products. The doughs of Kent et al. makes use of an intermediate $a_w$ moist portion (i.e., no greater than 0.85) to ensure microbial stability. High water activity (i.e., greater than 0.85) uncooked mixes (e.g., cakes, muffins, brownies, pancakes) or food and beverage products (e.g., salad dressings, soups, sauces, shakes, milk/juice blends) require increased levels of water. Most high water activity uncooked mixes and food and beverage products are fluid or flowable. Therefore, a high water liquid component would be needed in formulating a complete pre-mix. The high water activity liquid components would not be microbially stabilized by the method of Kent et al.

Accordingly, a need exists for shelf stable complete pre-mixes for preparing high moisture mixes and high moisture food and beverage products that would allow all of the ingredients, including water, to be present. There also exits a need for complete pre-mixes that allows ingredients to be highly functional for their intended purpose yet remain chemically and microbially stable, prior to being combined. A further need exists for a simple method of mixing the ingredients of food and beverage compositions that would minimize variabilities caused by mixing conditions.

An object of the invention is to provide shelf-stable complete pre-mixes.

Another object of the invention is to stabilize (i.e., microbially, chemically) complete pre-mixes comprising a high-water activity component.

Still another object of the invention is to stabilize the components of complete pre-mixes while substantially enhancing the performance of food ingredients.

SUMMARY OF THE INVENTION

According to the present invention, the foregoing and other objects are attained by separating food and beverage recipes into two or more components containing food ingredients.

In accordance with one aspect of the invention, the shelf-stable complete pre-mixes comprise two or more components, stored separately. At least one component must be an aqueous component, having a water activity greater than about 0.85. Preferably, the aqueous component has a pH less than about 4.5. The components are of sufficient composition upon combining, to provide the ingredients necessary to form a uncooked mix or a food or beverage product.

In accordance with another aspect of the invention, the shelf-stable complete pre-mixes comprise at least one liquid component having a water activity greater than about 0.85 and a pH of preferably less than about 4.5, and a second component having a water activity of preferably less than about 0.6. Because the amount of ingredients in each component vary, the second component may be in a liquid or solid form.

In accordance with still another aspect of the invention, the components are contained in a multi-compartment package having one or more rupturable seal(s), which upon rupturing, allows intermixing of the components by the preparer, at will. Intermixing of the components is provided by means of instructions supplied to the preparer.

DETAILED DESCRIPTION

Definitions

"Ready-to-cook mix" as used herein refers to combined food ingredients that require additional cooking (e.g., baking, frying, microwaving) to form a ready-to-eat food or beverage product.

"Pre-mix" as used herein refers to combined food ingredients that require the preparer to supply and/or add additional ingredients to have the necessary ingredients to form a uncooked mix or a food or beverage product.

"Complete pre-mix" as used herein refers to a pre-mix in which all necessary ingredients are provided, but the ingredients have not all been combined to form a uncooked mix or a food or beverage product.

"Food product" as used herein refers to food compositions in a ready-to-eat form.

"Beverage product" as used herein refers to beverage compositions in a ready-to-drink form.

"Solid" as used herein refers to wet or dry substances, wet or dry granulated substances, plastic substances and mixtures thereof.

"Water" as used herein refers to unbound water and encompasses water present in ingredients, for example, vinegar, wine, beer, flavor and the like.

"Food recipe" or "beverage recipe" refers to all of the ingredients in a food or beverage (i.e., total composition), but additional processing (mixing, blending, cooking) is required to achieve a food or beverage product.

"High water activity" as used herein refers to a water activity of greater than about 0.85.

"Shelf-stable" as used herein refers to resistance to microbial growth/activity at a temperature of from about 60° F. (15.5° C.) to about 80° F. (26.6° C.) with minimum change in component characteristics due to ingredient interactions, while retaining desirable attributes with respect to functionality, aroma, flavor, and color "Water-compatible ingredients" as used herein refer to ingredients that are shelf-stable or can be made shelf-stable in a water continuous phase, and has, upon mixing of the components, enhanced functionality in the food product composition, as compared to its having been contained in one of the other components during storage.

"Oil-compatible ingredients" as used herein refer to ingredients that are stable or can be made stable in the oil continuous phase, and has, upon mixing of the components, enhanced functionality in the food product composition, as compared to its having been contained in one of the other components during storage.

"Flour" as used herein refers to flours that are derived from tubers, cereals or grains, for example, whole wheat flour, semolina flour, straight hard flour, all purpose flour, soy flour, self-rising flour, straight soft flour, cake flour, pastry flour, potato flour, rice flour, rye flour, oat flour and mixtures thereof.

"Fat" or "oil" as used herein refers to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or otherwise modified. "Fat" or "Oil" also refers to non-toxic fatty materials having properties similar to triglycerides, herein referred to as "fat substitutes," which materials may be partially- or fully-indigestible. Reduced calorie fats and edible non-digestible fats, oils or fat substitutes are also included in the term. The terms "fat" and "oil" are used interchangeably. Mixtures of the above fats or other fats can also be used in the pre-mixes of the present invention "Leavening agent" as used herein refers to yeast or bacteria which generate carbon dioxide as end products of their metabolic functions or chemicals that can provide leavening action singly or in combination, (e.g., sodium bicarbonate, ammonium carbonate, bicarbonate, potassium bicarbonate), for example, sodium aluminum sulfate, dicalcium phosphate dihydrate, monocalcium phosphate monohydrate monocalcium phosphate anhydrous, 1-3-8 sodium aluminum phosphate, sodium acid pyrophosphate, potassium acid, tartrate, calcium ammonium phosphate, calcium carbonate, glucono-delta-lactone (GDL).

"Antioxidant" as used herein refers to ascorbic acid (and salts), ascorbyl palmitate, tert-butylhydroxyquinone, butylhydroxyanisole, butylyhydroxytoluene, gum guaic, propylgallate, sulfite and metabisulfite salts, thiodipropionic acid (and esters) plant extract exhibiting anti-oxidant properties e.g. tocopherol, rosemary and mixtures thereof.

"Gum" as used herein refers to pectin, xanthan gum, agar, gum arabic, guar gum, locust bean gum, algin, alginates, tragacanth, gellan, carob bean gum, sodium carboxymethylcellulose (CMC), carrageenan, gum karaya and mixtures thereof.

"Emulsifier" as used herein refers to mono- and di-glycerides polyglycerol esters, lecithin, polyoxyethylene sorbitan sodium stearoyl lactylate, sorbitan fatty acid esters, propylene glycol, esters of alginic acid and mixtures thereof as well as egg yolk solids, protein, gum arabic, carob bean gum, guar gum, propylene glycol esters of alginic acid, sodium carboxymethylcellulose, polysorbates and mixtures thereof.

"Protein" as used herein refers to milk protein from whole, skim or other low fat milk, whey proteins (with or without lactose), acid casein and caseinate, vegetable protein (e.g., soy, peanut, cottonseed) and mixtures thereof.

"Edible Acid or Acid" as used herein refers to organic and inorganic acids, for example, glucono-delta lactone, lactic acid, sorbic acid, citric acid, malic acid, fumaric acid, succinic acid, sulfuric acid, phosphoric acid, hydrochloric acid, benzoic acid, acid, soluble salts of these acids and mixtures thereof.

"Anti-microbial agent" as used herein refers to acetic acid and salts, benzoic acid and salts, ethylene oxide, nitrates, nitrites (potassium and sodium salts), propionic acid (and salts), propylene oxide, sorbic acid (and salts) sulfur dioxide sulfites and mixtures thereof.

"Water activity" or "$a_w$" as used herein refers to the ratio of the vapor pressure of a solution or mixture to the vapor pressure of pure water, at a specific temperature. The water activity is a measure of available water in the mixture.

"Sugar" as used herein refers to sugar as generic to monosaccharides, disaccharides, oligosaccharides, and polysaccharides, for example sucrose, glucose, fructose, maltose, high fructose corn syrups, and high maltose corn syrups. The term "sugar alcohol" is also used in its conventional sense as generic to the reduction product of sugars wherein the aldehyde or ketone group has been reduced to an alcohol. These sugars and sugar alcohols contain at least 3 hydroxy groups prior to esterification, and preferably from 4 to 8 hydroxy groups. Examples of suitable monosaccharides are those containing 3 hydroxyl groups such as xylose, arabinose, and ribose; the sugar alcohol derived from xylose, i.e., xylitol, is also suitable. Among 5 hydroxyl-containing monosaccharides that are suitable for use herein are glucose, mannose, galactose, fructose, and sorbose. A sugar alcohol derived from sucrose, glucose, or sorbose, e.g., sorbitol, contains 6 hydroxyl groups and is also suitable as the alcohol moiety of the fatty acid ester compound. Examples of suitable disaccharides are maltose, lactose, and sucrose, all of which contain 8 hydroxyl groups. Non-caloric or reduced calorie sweeteners are also meant to be included in the term "sugar". Examples of non-caloric or reduced calorie sweeteners include, but are not limited to, aspartame; saccharin; alitame, thaumatin; dihydrochalcones; cyclamates; steviosides; glycyrrhizins, synthetic alkoxy aromatics, such as Dulcin and P-4000; sucralose, miraculin; monellin; sorbitol; xylitol; talin; cyclohexylsulfamates; substituted imidazolines; synthetic sulfamic acids such as acesulfame, acesulfam-K and n-substituted sulfamic acids; oximes such as perillartine; rebaudioside-A; peptides such as aspartyl malonates and succanilic acids; dipeptides; amino acid based sweeteners such as gem-diaminoalkanes, meta-aminobenzoic acid, L-aminodicarboxylic acid alkanes, and amides of certain alpha-aminodicarboxylic acids and gem-diamines; and 3-hydroxy-4-alkyloxyphenyl aliphatic carboxylates or heterocyclic aromatic carboxylates.

"Starch" as used herein refer to raw and pregelatinized starches that are derived from tubers or grains, for example, wheat starch, potato starch, tapioca starch, cornstarch, oat starch, cassava starch and other starches familiar to those skilled in the art. This term also includes hydrolyzed starches that are typically obtained by acid or enzymatic hydrolysis of starches and modified starches that are chemically treated and have unique functionality, for example starches modified by esterification and etherification reactions, acetylated starches, starch acetates, starch esters, cross-linked starch and mixtures thereof.

Unless otherwise stated, all percentages, ratios and proportions expressed herein are by weight.

Several advantages of the present invention can be summarized as follows:

1) Preparation of ingredients to desired states (e.g., enhanced functionality);
2) Reduction or elimination in the number of separate weighings;
3) Reduction or elimination in weighing errors and ingredient omission;
4) Reduction or elimination of extraneous equipment needed by the preparer (e.g.mixing bowl, measuring cups, mechanical mixers); and
5) Flexibility and cost reduction (e.g., formulator may use emulsions, aqueous based ingredients, oil based ingredients or dry ingredients. This significantly reduces the costs associated with drying ingredients or making ingredients water or oil soluble or dispersible for a particular formula.

In the practice of the present invention, food recipes are separated into two or more components. At least one component must be a high-water-activity aqueous component. Preferably, the pre-mixes of the present invention comprise liquid components. The liquid components may be two high water-activity aqueous components or a high water-activity aqueous component and a low water activity liquid component. As is well known in the art of preparing food and beverage compositions, the precise formulations and ingredients contained in the compositions will vary depending on the precise product one seeks to make. Given the vast number of recipes and number of ingredients, the amount of water or oil required for a recipe may be limited and therefore two liquid components may not be possible in the complete pre-mix. Moreover, it may be desirable to separate optional ingredients (e.g., nuts, candy, dehydrated food/meat pieces, coconut). In these cases, the complete pre-mix may comprise at least one high water-activity aqueous component and one or more low water-activity component. The low water-activity components may be solid or liquid or combinations of solid and liquid components, stored separately.

High-Water Activity Aqueous Component

Suitable high-water activity aqueous components (hereinafter "aqueous component") are comprised of a single ingredient (e.g., water, vinegar, liquors, wine, fruit juice, vegetable juice) or a mixture of said ingredients with other ingredients. The aqueous component comprises all the water in the food or beverage composition and sufficient acid to provide an acidic pH. The aqueous component may additionally comprise other water compatible ingredients The aqueous component has a water-activity (hereinafter $a_w$) greater than about 0.85, preferably greater than about 0.90.

In addition to a high water-activity, the aqueous component of the present invention preferably has a pH of less than about 4.5, more preferably less than about 4.1 and even more preferably a pH in the range of about 2.75 to about 3.75.

The pH of the aqueous component is adjusted using an edible organic acid or inorganic acid. For taste reasons, the pH of the aqueous component is adjusted with lactic acid, citric acid, phosphoric acid and mixtures thereof. If a high pH is desired in the complete mixture (i.e., after components have been combined), a basic ingredient that will essentially neutralize the acid is included as an ingredient in a separate component.

The amount of added acid present will depend on the amount of water present in the aqueous component and the effect of additional ingredients.

Generally, acid will be present in an amount of about 0.1% to about 3.5%, preferably about 0.3% to about 2.0% and more preferably about 0.5% to about 1.0%, based on the total weight of the aqueous component.

The aqueous component additionally comprises low levels of an antimicrobial agent. The antimicrobial agent is present in a sufficient amount to prevent microbial growth. The amount will vary depending on the amount of water in the aqueous component, the particular antimicrobial agent used and other ingredients present in the aqueous component.

Generally the antimicrobial is present in an amount of from about 0.03% to about 4.00%, preferably from about 0.05% to about 3.00%, and more preferably from about 0.08% to about 1.00%, based on the total weight of the aqueous component.

In the practice of the present invention, the aqueous component preferably comprises, if required, non-reducing sugars, gums, acids, starches, salt, emulsifiers, proteins, and all egg solids present in the food or beverage composition. Reducing sugars are not included in the aqueous component because they are proned to undesirable reactions with other ingredients.

Low Water-activity Component

Suitable low water-activity components can comprise a single ingredient (nuts, oil, candy, powder, dehydrated food ingredients) or a mixture of ingredients. The low water-activity component may be either a liquid or solid. Preferably, the low water-activity component has a $a_w$ below about 0.6, more preferably in a range of about 0.2 to about 0.5 and even more preferably in the range of about 0.3 to about 0.4. Typically, the low water-activity component comprises oil compatible ingredients or dry ingredients required by the recipe. Ingredients suitable for use in the low $a_w$ component, if required, include, but are not limited to, flour, oil, leavening agent, gums, emulsifiers, proteins, acids, starch and sugar (reducing/non-reducing).

Additional Ingredients

Additional ingredients may be included in either the aqueous component or low water-activity component as long as they can be stabilized. The additional ingredients that may be added include, but are not limited to fruits, nuts, candy, vegetable pieces, meat pieces, herbs, spices, processing additives (e.g., carbon dioxide, nitrogen), antifoaming agents, enzymes, clarifying and flocculating agents, color control agents, malting and fermenting agents, anticaking agents, bases, buffering salts, antistick agents, colors and color modifiers, flavors and flavor potentiators, nutrients, minerals, vitamins, chelating agents and tracers (e.g., titanium dioxide).

Method of Separating Food Ingredients

In the practice of the present invention, food and beverage ingredients are grouped into those that are water-soluble, water-dispersible, oil-soluble, oil-dispersible and also acidic, alkaline, neutral and others. In the case where high levels of solids are present, the recipe can be examined to determine if the number of ingredients can be reduced, for example, self-rising flour can be substituted for flour and a leavening acid. Some ingredients may be placed in either the aqueous component or the low water-activity component. In such situations, one must take into account the amount of available water present in the recipe as a carrier. Preferably, gums and in particular egg proteins are included in the aqueous component of the pre-mix to ensure complete hydration. Moreover, egg proteins have reduced functionality if included in a dry component that contains fat.

Next, the ingredients are grouped into those suitable for the aqueous component and those suitable for the low water-activity component taking into account the chemical and microbial stability of each group as mixtures and the solubilities and viscosities of these mixtures. One skilled in the art can test the stability of the combined ingredients in each component by routine testing (e.g., chemical assays, plate count, storage stability tests) to determine if there is significant microbial growth or significant loss in the functionability of ingredients in the time period and at the appropriate temperature that the pre-mix should be kept.

The components of the pre-mix are prepared to ensure homogeneity and to maintain uniformity during storage. The aqueous component is prepared by hydrating any gums, if present. Separately, the dry ingredients of the aqueous component are combined and mixed until homogenous. Next the gum solution is added to the dry mixture and mixed until all of the dry ingredients are dispersed. A small amount of the aqueous mixture is weighed and diluted about ten fold with distilled water. The diluted solution of the aqueous mixture is then titrated with an aqueous acid solution (~25%) to the desired pH. The amount of aqueous acid solution required to acidify the total aqueous component is calculated and added to the aqueous component. The pH and $a_w$ of the aqueous phase are tested by known methods. The aqueous phase thus prepared is placed into a container or compartment and sealed.

The low water-activity component is prepared by mixing the dry ingredients. If oil is present, the dry ingredients are first mixed to obtain a uniform distribution, and then the oil is added. The combined dry ingredient and oil are then mixed until the particles are uniformly coated. The $a_w$ of the low water-activity component is tested. The low water-activity component is then placed into a container or compartment and sealed.

Recipes

Many food and beverage recipes demonstrate improved shelf stability by the practice of the present invention. Preferred food compositions can be grouped into two general categories: 1) flour based compositions and 2) water based compositions.

Flour Based Compositions

Flour based compositions include, but are not limited to compositions such as doughs and batters. Depending on the relative proportions of flour and water, a mixture can be classified as a dough or batter. In doughs, the water content is low enough that the water-protein complex, gluten, constitutes the continuous phase in which the other components (e.g., starch and gas pockets) are embedded. Batters, however, contain several times as much water as do doughs and water is the continuous phase in which the proteins, starch and gas are dispersed. Generally, doughs are stiff enough to be manipulated by hand, while batters are thin enough to be poured. Examples of food compositions made from batters and doughs are cakes, muffins, pancakes, waffles, brownies, breads, donuts, pretzels, crackers and cookies. All of which are within the scope of the present invention.

The composition of batters and doughs are well known in the art. There are common ingredients in batters and doughs, specifically flour and water. In addition to flour and water, the batters or doughs may contain ingredients such as milk solids, gums, leavening agents, flavoring, eggs, shortening and sugar. The ingredients may be formulated in slightly different ways to yield various types of food products.

Flour-based compositions are preferably separated into at least one aqueous component and one low water-activity component. The aqueous component includes all the water required in the composition, an anti-microbial ingredient and sufficient acid to lower the pH to lower than about 4.5. The aqueous component also preferably comprises the eggs, sugar, salt, gums and water-soluble flavors present in the food composition. The gums and egg are completely hydrated. Sufficient hydration is desirable for obtaining increased functionality.

The liquid, low water-activity component comprises all the flour and any oil, leavening agent, oil-soluble flavors and emulsifiers, if required.

In addition to an aqueous component and liquid low water-activity component, the flour based compositions may include a solid component. The solid component may contain various dry ingredients, for example, nuts, candy pieces, raisins, etc. for the preparer to add as desired.

A general range of ingredients (based on weight of the total composition) for flour based doughs and batters are as follows:

| Ingredient | Wt.% of Total Composition |
| --- | --- |
| Flour | 10%–70% |
| Total Water | 5%–90% |
| Shortening and/or Oil including emulsifiers | 0%–70% |
| Total Protein (e.g milk solids, egg solids or substitutes) | 0%–10% |
| Sugar | 0%–70% |
| Leavening | 0%–4% |
| Gums | 0%–1% |
| Antimicrobial | 500 ppm–1.5% |
| Acid | 0–3.5% |
| Flavors | 0%–0.5% |

Particularly preferred flour based products are brownies, cakes and muffins.

The preferred flour based products comprise from about 20% to about 70% flour, preferably from about 25% to about 50%, more preferably 30% to about 40% flour.

Sugar is also included in the preferred flour-based products. The sugar may be granulated, powder, liquid or a combination thereof. The sugar, if placed in the water component, must not be a reducing sugar. As used herein "reducing sugar" refers to those sugars which are generally recognized as reducing sugars because of their reaction with Fehling's solution. Sucrose is not considered to be a reducing sugar. Reducing sugars undergo non-enzymatic browning reactions much more readily than non-reducing sugars. The particular amount of sugar included in the product will depend on the sweetness intensity of the particular sweetener and the sweetness effect desired. Usually, the sugar comprises from about 12% to about 70% of the product. Preferably, the sugar comprises from about 15% to about 50%, more preferably from about 20% to about 40% of the product.

Preferred flour-based products of the present invention typically comprises 0% to 70%, preferably from about 15% to about 40%, more preferably from about 20% to about 30% fat. The fat of the flour-based products can comprise a triglyceride oil, or fat which can be natural or synthetic, or a low calorie fat. Low calorie fat materials and triglyceride oil or mixtures thereof, can be used. Preferably, the flour-based products have a low water-activity component comprising a liquid triglyceride oil. As used herein, the term "triglyceride oil" refers to those triglyceride oils which are fluid or liquid above about 15° C. The triglyceride oil useful as the fat of the present invention can include mixtures of liquid oils with solid triglycerides. These triglyceride oils consist primarily of triglyceride materials, but can also include other components such as mono- and diglycerides.

The preferred flour-based products also comprise a thickener selected from the group consisting of starches, edible gums, proteins, and mixtures of these materials. Preferred thickeners for use in the flour-based products of the present invention are combinations of starch and gums. The particular amount of thickener included depends upon the particular product. The amount is also dependent on whether the thickener is a gum, starch or combination. Combinations of gum and starches as thickeners are typically present at levels of about 0.1% to about 5%.

The preferred flour-based products of the present invention also include egg solids, for example, egg or egg whites selected from the group consisting of egg substitutes, egg, liquid whole egg, stabilized dried whole eggs, frozen whole egg, sugared frozen egg, salted frozen egg, dried whole egg, frozen egg white, dried egg white, liquid egg white, frozen egg white, sugared egg white, salted egg white, or combinations of the foregoing egg ingredients. The egg or egg white usually comprises from about 0% to about 10% of the flour-based product. Preferably, the egg or egg white comprises from about 2% to about 8%, more preferably from about 4% to about 6% of the product.

The preferred flour-based products require various levels of leavening. For example, brownies require a low level of leavening while cakes require a much higher level of leavening. Typically the preferred flour-based products comprise from about 0.01% to about 3%, preferably from about 0.5% to about 2.0% of a leavening agent.

An acid is also preferred in the flour-based products. The acid may be either liquid or dry. Preferably, phosphoric or lactic acid is used for taste purposes however, any of the edible acids and combinations of edible acids may be used. The flour-based products of the present invention contain an effective amount of acid to reduce the pH of the aqueous component to a level below about 4.5, preferably below about 4.1. Typically, an amount from about 0.1% to about 3.0%, preferably from about 0.2% to about 2.0% and more preferably 0.5% to about 1.0% is sufficient.

The amount of water included in the flour-based product depends on the particular consistency and texture desired in the product. Usually, water comprises from about 10% to about 70% of the product. Preferably, water comprises from about 15% to about 50%, more preferably from about 20% to about 40% of the product.

Typically, a low level of an anti-microbial agent is included in the preferred flour-based products to ensure microbial stability. The amount of anti-microbial agent added will depend on the ingredients present in the composition. Generally, a level of about 0.03% to about 4.00%, preferably about 0.1% to about 3.00% is sufficient.

Water Based Compositions

Water based compositions are compositions comprising large quantities of water. The compositions are typically fluid or are thickened or gelled using starch, flour, gums or proteins. The ingredients may be formulated in slightly different ways to yield various types of food products. Preferred examples of water based compositions include sauces, gravies, dips, soups, dressings and imitations thereof, condiments and beverages. The compositions may be low-calorie and fat-free. Emulsified or nonemulsified compositions are included in the preferred water based compositions as well.

Examples of preferred emulsified products include dressings, sauces and dips. Emulsified oil dressings typically refer to three generally recognized types of dressings: sandwich dressing, salad dressing, and imitations thereof. Sandwich dressing is an emulsified semi-solid food prepared from vegetable oil(s), one or more acidifying ingredients, one or more egg yolk-containing ingredients or emulsifiers, as well as other optional ingredients such as vinegar, liquor, whiskeys, salt, sweeteners, herbs, spices, monosodium glutamate, sequestrants, etc. Sandwich dressings, by definition, contain, not less than 65% by weight vegetable oil, although most commercial mayonnaise products contain approximately 80% by weight vegetable oil. Examples of sandwich dressings are mayonnaise and tartar sauce.

A lower calorie version of emulsified oil dressing products are salad dressings. Salad dressings are often similar to sandwich dressings in consistency and texture (e.g. spreadable or pourable) and contain not less than 30% by weight vegetable oil. Most commercial salad dressing products contain approximately 45% by weight vegetable oil, or about one-half that of most commercial sandwich dressing products.

Imitation dressings differ from regular and low-calorie dressings and sauces in the fact that they contain a thickening agent which is typically a starch, gum or fiber (e.g., cellulose). The thickening agent provides the consistency and texture that would be missing as the result of the lower level or absence of vegetable oil. Because of this reduction or absence of vegetable oil, imitation dressings contain significantly less calories. Imitation dressings include both pourable and spreadable products.

The basic ingredients in water based compositions are water, optionally fat, and one or more thickening agent. As used herein "thickening agent" refers to ingredients from the group consisting of proteins, gums, starch, flour, fiber and mixtures thereof. Additional ingredients commonly added for their contribution to flavor include sugar, oil, salt, spices and natural and/or artificial flavors.

Water based compositions are preferably separated into at least one aqueous component and at least one liquid, low water-activity component or at least two aqueous components. Optionally, a dry component may also be included in with either combination.

When aqueous components are present, the aqueous components comprise all the water in the food composition, sufficient acid to lower the pH to about 4.5 an antimicrobial agent and eggs, proteins, gums and sugar (if required). The water component may additionally contain any water soluble flavors.

Low water-activity components, if present, comprise starch, salt, and all the fat or oil (if required). The low water-activity component preferably comprise oil soluble flavors, emulsifiers other oil-compatible ingredients. If desired, a separate dry component may be included to comprise additional ingredients, ingredients that can not be carried by the oil, or other ingredients not included in the aqueous component or the low water activity liquid component.

A general range of ingredients (based on weight of the total composition) for water based compositions are as follows:

|  | Beverage | Pourable Dressing / Emulsified Dressing | Soup, sauce, or gravy |
| --- | --- | --- | --- |
| Water | 20%–90% | 25%–98% | 50%–70% |
| Oil/fat | 0%–50% | 0%–60% | 0.6%–25% |
| Thickening Agent | 0%–3% | 0.25%–50% | 0%–6% |
| Emulsifier | 0.2%–4% | 0–4% | 1%–3% |
| Protein Source | 0%–25% | 0%–15% | 0%–5% |
| Vinegar | 0%–2% | 0%–12% | 0%–2% |
| Flavor | 0%–2% | 0%–2% | 0%–3% |

-continued

|  | Beverage | Pourable Dressing / Emulsified Dressing | Soup, sauce, or gravy |
| --- | --- | --- | --- |
| Sugar | 0%–20% | 0%–30% | 0%–15% |
| Acid | 0.2%–2.5% | 0.1%–3.5% | 0.1%–4% |

Preferred emulsified dressing products of the present invention can comprise from about 30% to about 80% fat. The fat of these emulsified oil dressing products comprises a triglyceride oil, or fat which can be natural or synthetic, or a low calorie fat. Low-calorie fat materials and triglyceride oil can be used together to provide reduced calorie benefits, as well as desirable consistency and texture in the product. When a lower calorie product is desired from about 50% to about 90% low calorie fat can be used with the triglyceride oil, preferably from about 60% to about 70% low calorie fat and from about 30% to about 40% triglyceride oil are used. The triglyceride oil useful as the fat of the present invention can include mixtures of liquid oils with solid triglycerides. These triglyceride oils consist primarily of triglyceride materials, but can also include residual levels of other components such as mono- and diglycerides. To remain fluid or liquid at temperatures below 15° C., the triglyceride oil contains a minimum amount of glycerides having melting points higher than about 15° C. so as to limit the solids increase when the triglyceride oil is cooled. It is desirable that the triglyceride oil be chemically stable and resistant to oxidation.

The preferred dressings also comprise a thickener selected from the group consisting of starches, flours, edible gums, proteins, and mixtures of these materials. Preferred thickeners for use in the dressings of the present invention are pregelatinized starch and modified starch, and especially combinations of pregelatinized starch and modified food starch. The particular amount of thickener included in the dressing product is highly dependent upon whether it is an gum or starch. In the case of starches, the thickener comprises from about 2% to about 5% of the product. Preferably, starch comprises from about 2% to about 3% of the product. Edible gum thickeners are typically present at lower levels.

The emulsified dressing products of the present invention may also egg solids, for example, egg or egg whites selected from the group consisting of egg substitutes, egg, liquid whole egg, stabilized dried whole eggs, frozen whole egg, sugared frozen egg salted frozen egg, dried whole egg, frozen egg white, dried egg white, liquid egg white, frozen egg white, sugared egg white, salted egg white, or combinations of the foregoing egg ingredients. The egg solid usually comprises from about 5% to about 15% of the emulsified dressing product. Preferably, the egg yolk comprises from about 11% to about 13% of the product.

The amount of water included in the dressing depends on the particular consistency and texture desired in the product. Usually, water comprises from about 25% to about 75% of the product. Preferably, water comprises from about 27% to about 33% of the product.

An acid and an acidifying liquid is also preferred in the dressing products. Preferred acidifying liquids include vinegar or any vinegar diluted with water such as cider vinegar and white vinegar, lemon juice and/or lime juice. Vinegars can be natural vinegars made by fermentation of juices to form acetic acid as for example, apple cider vinegar and red wine vinegar. Acetic acid can also be added to water and flavored to produce a vinegar taste. Preferred acids include citric and/or malic acid. Mixtures of these acidifying ingredients are preferred. Lemon juice, lime juice, citric acid and malic acid are typically used in combination with vinegar as the acidifying component. Usually, the combination acid and acidifying liquid comprise from about 3% to about 12% of the dressing product. Preferably, the combination acid and acidifying liquid comprise from about 3% to about 5% of the product. The combination acid and acidifying liquid must be present in sufficient amounts to lower the pH of the dressing aqueous component to less than about 4.5, preferably 4.1 and more preferably 3.5.

Preferred emulsified dressing can comprise other optional, but desirable, ingredients. One of these ingredients is a nutritive carbohydrate sweetener or sweeteners. Usually, the nutritive sweetener comprises from about 0.5 to about 5.0% of the product. Preferably, the nutritive sweetener comprises from about 0.5% to about 2.5% of the product.

If an extra calorie reduction benefit is desired, non-caloric or reduced calorie sweeteners can be used wholly or partially in place of the nutritive carbohydrate sweetener. The particular amount of non-caloric or reduced sweetener included in the dressing will depend on the sweetness intensity of the particular sweetener and the sweetness effect desired. Generally from 0.1% to 1.0% is used of an non caloric or reduced calorie sweetener.

Another desirable optional ingredient present in the dressing is a sequestrant(s). Suitable sequestrants include, but are not limited to, calcium disodium ethylene diamine tetraacetate (EDTA), and disodium EDTA, ascorbic acid, sodium hexameta phosphate. These sequestrants are typically included in the dressing to preserve the color and/or flavor of the dressing product. These sequestrants are typically included in an amount of from about 0.004% to about 0.200%, preferably 0.01% to about 0.10% of the product.

Other ingredients typically included in the dressing are salt, preservatives and spices/flavorants. Preferred spices and flavorants include mustard powder, onion powder, garlic powder, oleoresin paprika, sage, and egg flavors. The salt, preservatives and spices/flavorants are included in amounts to provide the saltiness, preservative properties and flavor/aroma properties desired. If desired, bulking agents such as maltodextrins or polydextrose can be included in appropriate amounts in the dressing.

Package

The aqueous component and the low water-activity component may be packaged in separate containers or a multi-compartment package. Preferably the components are stored in multi-compartment flexible packages having rupturable seals, for example, those disclosed in U.S. Pat. No. 3,074,544 and U.S. Pat. No. 5,287,961. When the rupturable seals of these packages are ruptured, the components in the separated compartments are allowed to mix together, thus, minimizing the variability caused by using different mixing equipment. Particularly preferred multi-compartment packages include two or more separated compartments. The multi-compartments comprise one or more aqueous components or may comprise at least one aqueous and at least one low-$a_w$ component. The compartments are substantially flexible and are hermetically sealed. One or more rupturable seals are included on the compartments. The rupturing of the seals allows communication from one compartment to another compartment in order to form a uncooked mix or a food or beverage product. Most preferred packages are disclosed in co-pending applications U.S. Ser. No. 08/865,798 and U.S. Ser. No. 08/865,899.

Preparation of Uncooked Mixes and Food or Beverage Products

To prepare the uncooked mix or food or beverage product the preparer combines the contents of each compartment or container. If desired, the preparer may combine portions of each container, so long as the ratio of aqueous component to water component is maintained. However, this introduces the possibility of measuring errors.

In a preferred multi-compartment package, the preparer ruptures the rupturable seal by hand manipulation of the more liquid side of the compartment. If two liquids are present, either side may be manipulated. Preferably, such manipulation is in the form of squeezing, twisting or pressing on the compartment to create sufficient pressure to burst, sever, separate, rupture, or open the rupturable seal. Opening of the rupturable seal allows the components contained in the separated compartments to be placed in communication with each other for intermixing. The intermixing can be performed by squeezing or kneading the compartments from side to side until the compartments are uniformly mixed. In multi-compartment packages that contain additional food pieces, for example, fruit pieces, candy, nuts or meat pieces, it may be desirable to mix the components in the other compartments before the addition of the food pieces.

The following examples illustrate food composition embodying the principles of the invention with the various ingredients separated into either an aqueous component or a low $a_w$ component.

It will be appreciated that minor modifications of the present invention, within the skill of those in the art, can be undertaken without departing from the scope of the invention. In particular, stabilizing compositions by separating the recipes into 2 or more components comprising at least one high water aqueous component.

EXAMPLE 1

Muffins

Aqueous Component

| Ingredient | % Aqueous Total |
| --- | --- |
| Sugar | 21.40 |
| Salt | 0.60 |
| Dried Whole egg white | 2.00 |
| Xanthan | 0.2 |
| Potassium-sorbate | 0.07 |
| Water | 34.48 |
| Citric acid / mL | 0.25 |
| Total | 58.82 |

Low Water-activity Component

| Ingredient | % Total |
| --- | --- |
| Flour | 31.1 |
| Shortening/emulsifier | 7.51 |
| Soda | 0.88 |
| SALP(sodium aluminum phosphate | 0.62 |
| Dextrose | 0.62 |
| Flavor | 0.36 |
| Total | 41.1 |

The aqueous phase is prepared as follows; the gums are hydrated by dispersing under high shear using a portion of the water warmed to a temperature of about ~110° F. In a separate bowl, the sugar, salt and dried whole egg are mixed using an electric mixer for about 5 minutes, until homogenous. The gum solution is then add to the dry ingredients. The combined ingredient are mixed until all of the dry ingredients are well dispersed. The remaining water is used to dissolve the citric acid. This acid solution then added to the mixture. The resulting aqueous component has a pH of about 4.1 and a water activity of about 0.9. The aqueous component is then packaged in a suitable container.

The low water-activity component is prepared by mixing the flour with the shortening and oil. Once the homogenous mixture is obtained, soda, dextrose and flavors are added. The combined ingredients are mixed for about 30–45 minutes at low speed to ensure homogeneity. The blueberries are then added. The resulting low water-activity component has a water activity of about 0.4. The low water-activity component is then packaged in a suitable container

EXAMPLE 2

Yellow Cake Batter

Low Water-activity Component

| Ingredient | % Total |
| --- | --- |
| Flour | 23.23 |
| Dextrose | 0.44 |
| Flavor | 0.33 |
| Enrichment | trace |
| Sodium bicarbonate | 0.56 |
| Shortening | 12.57 |
| Yellow Lake #5 | 0.02 |
| Total | 37.141 |

The aqueous component is prepared as follows: The sugar, salt and dried whole egg are mixed for about 5 minutes, until homogenous. In a separate bowl, the PGE is dispersed under high shear using water warmed to a temperature of about 150° F. (65.5° C.). The water/PGE solution is cooled to a temperature of about 110° F. (43.3° C.). The gums and starch are added and hydrated in the solution using high shear mixing. The yellow #5 and potassium sorbate are then added. The solution is then added to the dry mixture containing the sugar, salt and dried whole egg. The combined ingredients are mixed until all of the dry ingredients are well dispersed. A small amount of the mixture is removed and diluted ten-fold with distilled water. This mixture is titrated with an aqueous solution (~25%) phosphoric acid to the desired pH. The amount of acid solution required to acidify the total mixture is calculated and added to the total mixture while mixing. The resulting aqueous component has a pH of about 4.1 and a water activity of about 0.9. The aqueous component is then packaged in a suitable container.

The low water-activity component is prepared by mixing the flour, sodium bicarbonate, dextrose, flavors and enrichment until a homogeneous mixture is obtained. In a separate bowl the shortening and the yellow Lake #5 are mixed. Once a homogeneous mixture is obtained, the shortening and Lake mixture is then added to the other ingredients. The combined ingredients are mix for about 30–45 minutes at low speed to ensure homogeneity. The resulting low water-activity component has a water activity of about 0.4. The low water-activity component is then packaged in a suitable container.

EXAMPLE 3

Brownie Batter

Aqueous Component

| Ingredient | % Total |
| --- | --- |
| Powdered sugar | 7.533 |
| Dried whole egg | 1.805 |
| Sugar | 32.466 |
| Salt | 0.676 |
| Carrageenan | 0.076 |
| Potassium sorbate | 0.070 |
| Distilled Deionized Water | 15.207 |
| approx. Phosphoric acid soln | 0.500 |
| Total | 58.334 |

Low Water-activity Component

| Ingredient | % Total |
| --- | --- |
| Flour | 21.584 |
| Wheat starch | 1.654 |
| Dextrose | 0.765 |
| Flavor | 0.087 |
| Sodium bicarbonate | 0.013 |
| Shortening | 5.871 |
| Sunflower oil | 6.723 |
| Cocoa | 4.966 |
| Total | 41.666 |

The aqueous component is prepared as follows: the gums are hydrated by dispersing under high shear using warm (~43.3° C.) (~110° F.) water. In a separate bowl, the powdered sugar and part of the granulated sugar are mixed using an electric mixer. The dried whole egg is added to the sugar and mixed for about 5 minutes, until homogenous. The salt and potassium sorbate are added to the dry mixture containing the sugar and egg solids. The gum solution is then add to the dry ingredients. The combined ingredients are mixed until all of the dry ingredients are well dispersed. A small amount of the mixture is removed and diluted tenfold with distilled water. This mixture is titrated with an aqueous solution (~25%) phosphoric acid to the desired pH. The amount of acid solution required to acidify the total mixture is calculated and added to the total mixture while mixing. The resulting aqueous component has a pH of about 4.1 and a water activity of about 0.87. The aqueous component is then packaged in a suitable container.

The low water-activity component is prepared by mixing the flour with the shortening and oil. Once the a homogenous mixture is obtained, soda, dextrose, flavors, and cocoa powder is added. The combined ingredients are mix for about 30–45 minutes at low speed to ensure homogeneity. The resulting low water-activity component has a water activity of about 0.4. The low water-activity component is then packaged in a suitable container.

EXAMPLE 4

Fluid Salad Dressing

Aqueous Component

| Ingredient | % Total |
| --- | --- |
| Water | 27% |
| Vinegar | 10% |
| Starch | 5% |

-continued

| Ingredient | % Total |
| --- | --- |
| Salt | 2% |
| Sugar | 15% |
| Egg yolk | 5% |
| Total | 64% |

Low Water-activity Component

| Ingredient | % Total |
| --- | --- |
| Soybean oil | 35% |
| Spices, mustard flavor | 1% |
| Total | 36% |

The aqueous component of the salad dressing is prepared by dispersing the egg yolk in the sugar by using an electric mixer. When fully dispersed, the starch, salt and the water are added with mixing. When fully mixed the vinegar is added. The resulting aqueous component has a water activity of about 0.92, and a ph of about 3.2. The aqueous component is packaged in an appropriate container and stored at ambient temperatures.

The low water-activity component is prepared by mixing together the oil and flavor. The resulting low water-activity component has a water activity of about 0.4. The low water-activity component is packaged in an appropriate container and stored at ambient temperatures.

EXAMPLE 5

Spoonable Salad Dressing
Aqueous Component

| Ingredient | % Total |
| --- | --- |
| Water | 23% |
| Vinegar | 11% |
| Sugar | 10% |
| Egg Yolk | 4% |
| Salt | 2% |
| Starch | 6% |
| Total | 56% |

Low Water-activity Component

| Ingredient | % Total |
| --- | --- |
| Soybean oil | 42% |
| Mustard oil/flour | 1% |
| Spices/oils/meat bits | 1% |
| Total | 44% |

The aqueous component of the salad dressing is prepared by dispersing the egg yolk in the sugar by using an electric mixer. When fully dispersed, the starch, salt and the water are added with mixing. When fully mixed the vinegar is added. The resulting aqueous component has a water activity of about 0.92, and a pH of about 3.8. The aqueous component is packaged in an appropriate container and stored at ambient temperatures.

The low water-activity component is prepared by mixing together the oil and mustard flour until the flour is well coated. The remaining low water activity ingredients (e.g., oils, meat bits) are added to the mixture. The resulting low water-activity component has a water activity of about 0.4. The low water-activity component is packaged in an appropriate container and stored at ambient temperatures.

EXAMPLE 6

Nutritious Orange Drink
Aqueous component

| Ingredient | % Total |
| --- | --- |
| Water | 87.71 |
| Sugar | 10.25 |
| Citric acid | 0.32 |
| Sodium citrate | 0.05 |
| Potassium sorbate | 0.03 |
| Sodium hexametaphosphate | 0.13 |
| Total | 98.49 |

Low Water-activity Component

| Ingredient | % Total |
| --- | --- |
| Starch hydrolysate | 1.0 |
| Cloud oil | 0.04 |
| Colors (FD&C Yellow 5 & 6) | 0.30 |
| Flavor | 0.11 |
| Ascorbic acid | 0.01 |
| 1% βcarotene | 0.05 |
| Total | 1.51 |

The aqueous component of the nutritious orange drink is prepared by dissolving in sequence the sugar, acid, sodium citrate, potassium sorbate and sodium hexametaphosphate in the water. The resulting aqueous component has a water activity of about 0.98 and a pH of about 3.6. the aqueous component is packaged in an appropriate container and stored at ambient temperature. The low water-activity component is prepared by mixing into the starch hydrolysate the cloud oil, colors, flavors, ascorbic acid and β carotene until well dispersed. The resulting low water-activity component has a water activity of about 0.4. The low water-activity component is packaged in an appropriate container and stored at ambient temperature.

EXAMPLE 7

Any of the products made in any of Examples 1–6 above can be packaged in a multi-compartment packaging unit having one or more rupturable seal(s) between said compartments. The seal will remain intact during shipping and storage and will be ruptured by the preparer, when desired, preferably just prior to use. Once the seal is ruptured by the preparer, he will according to packaging instructions, intermix the contents, and perform any further steps to finish the product, as necessary and appropriate.

What is claimed is:

1. A shelf-stable pre-mix comprising two or more components, wherein at least one component is an aqueous component having a water-activity greater than about 0.85 and has a pH of less than about 4.5; wherein the components are stored separately, but are combinable; and wherein are included all ingredients necessary to form a product selected from the group consisting of ready-to-cook mixes, food products and beverage products.

2. A pre-mix according to claim 1 wherein at least one component is a low water-activity component and wherein the low water-activity component has a water-activity of less than about 0.6.

3. A pre-mix according to claim 2 wherein the low water-activity component has a water-activity of less than about 0.5.

4. A pre-mix according to claim 2 wherein the low water-activity component comprises fat.

5. A pre-mix according to claim 2 wherein the product is selected from the group consisting of ready-to-cook doughs or ready-to-cook batters.

6. A pre-mix according to claim 5 wherein the aqueous component is contained in a compartment of a multi-compartment packaging unit having at least one rupturable seal that separates the components which, upon rupturing allows intermixing of the components.

7. A pre-mix according to claim 2 wherein the product is a beverage.

8. A pre-mix according to claim 3 wherein the aqueous component further comprises an anti-microbial agent.

9. A pre-mix according to claim 8 wherein the low water-activity component is liquid.

10. A pre-mix according to claim 8 wherein the low water-activity component is a solid.

11. A premix according to claim 10 wherein the product is selected from the group consisting of ready-to-cook doughs or ready-to-cook batters.

12. A pre-mix according to claim 8 wherein the aqueous component comprises water, a non-reducing sugar, protein and an edible acid; and wherein the the low water-activity component comprises oil, flour and a leavening agent.

13. A pre-mix according to claim 12 wherein the edible acid is selected from the group consisting of lactic acids, phosphoric acid, citric acid, glucono-delta lactone, and mixtures thereof.

14. A pre-mix according to claim 8 wherein the aqueous component comprises, from about 12% to about 70% water; from about 15% to about 40% non-reducing sugar; from about 1% to about 4% protein; from about 0.1% to about 2% acid; and wherein the low water-activity component comprises, from about 20% to about 40% flour; from about 15% to about 40% fat; and from about 0.01% to about 2% of a leavening agent.

15. A pre-mix according to claim 14 wherein the food product is a cake, brownie, cookie, or muffin.

16. A pre-mix according to claim 8 wherein the aqueous component comprises, from about 25% to about 75% water, from about 5% to about 15% protein, from about 2% to about 5% thickener, and from about 3% to about 5% of an acidifying liquid; and wherein the low water-activity component comprises, from about 30% to about 80% fat.

17. A pre-mix according to claim 16 wherein the food product is selected from the group consisting of sauces, gravies, dressings or soups.

18. A pre-mix according to claim 1 wherein the aqueous component is contained in a compartment of a multi-compartment packaging unit having at least one rupturable seal that separates the components which, upon rupturing allows intermixing of the components.

* * * * *

UNITED STATES PATENT AND TRADEMARK OFFICE
CERTIFICATE OF CORRECTION

PATENT NO. : 6,013,294
DATED : January 11, 2000
INVENTOR(S) : Paul Ralph Bunke et al.

It is certified that error appears in the above-identified patent and that said Letters Patent is hereby corrected as shown below:

Column 1, line 41, after "or a" insert -- food or beverage product. The resulting food or beverage product, in terms of --.
Column 9, line 63, "triglyceridc" should read -- triglyceride --.
Column 10, line 52, "arc" should read -- are --.
Column 15, line 61, after "bowl" insert -- , --.
Column 17, line 24, "ph" should read -- pH --.

Signed and Sealed this

Twenty-fourth Day of April, 2001

NICHOLAS P. GODICI

*Attest:*

*Attesting Officer*  Acting Director of the United States Patent and Trademark Office